March 22, 1960 E. A. PETROCELLI 2,929,978
STARTING CONTROL FOR SINGLE PHASE MOTOR
Filed Jan. 23, 1959
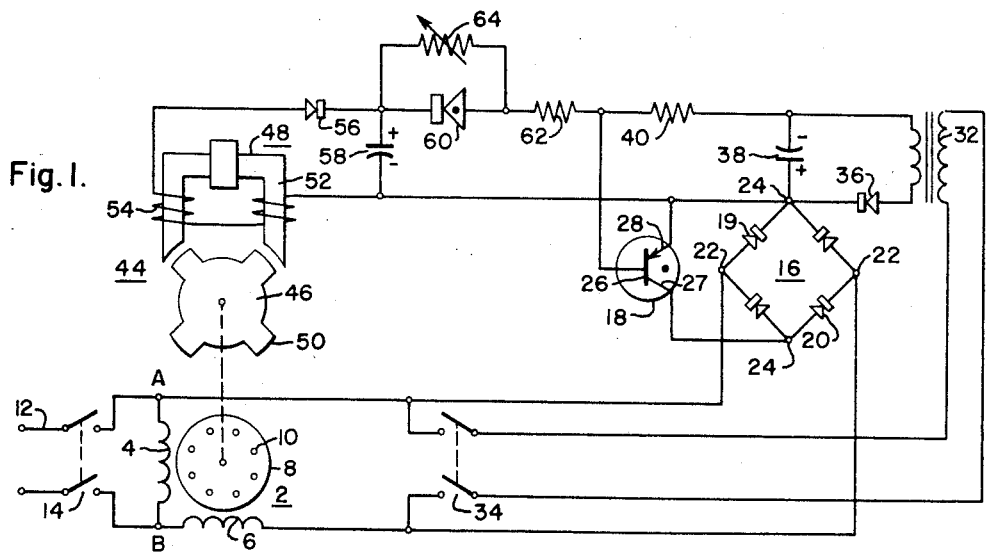
Fig. 1.
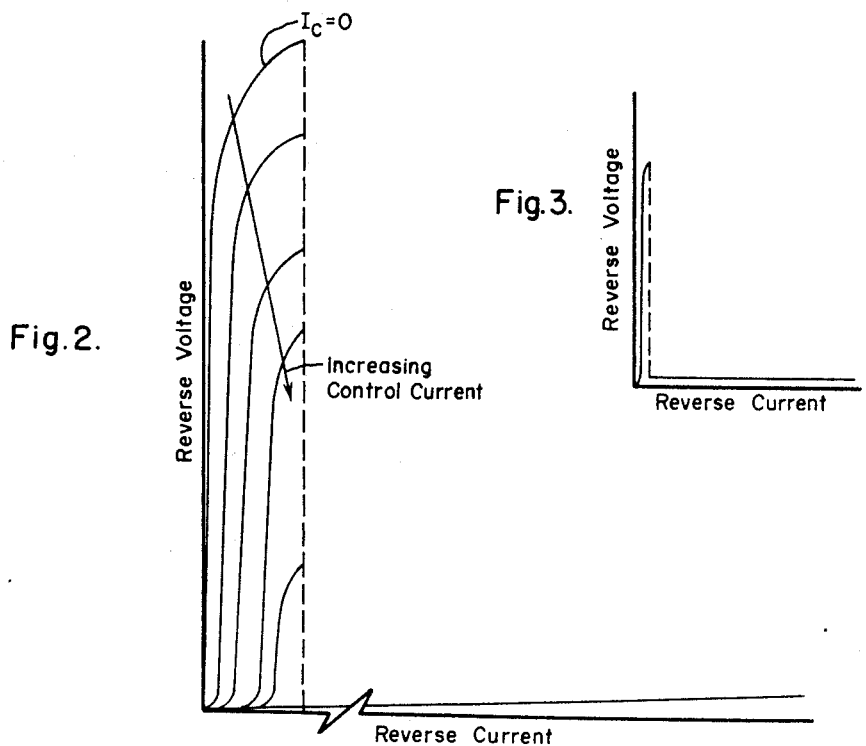
Fig. 2.
Fig. 3.
WITNESSES:
Bernard R. Gieguey
Ernest P. Klipfel
INVENTOR
Edward A. Petrocelli
BY
ATTORNEY

United States Patent Office 2,929,978
Patented Mar. 22, 1960

2,929,978
STARTING CONTROL FOR SINGLE PHASE MOTOR

Edward A. Petrocelli, Franklin Township, Allegheny County, Pa., assignor to Westinghouse Electric Corporation, East Pittsburgh, Pa., a corporation of Pennsylvania Application January 23, 1959, Serial No. 788,673

8 Claims. (Cl. 318—221)

The present invention relates to speed sensitive switching apparatus, and more particularly relates to a speed switching apparatus for a single phase electric motor.

A single phase electric motor generally has two windings, the main or running winding and the auxiliary or starting winding, which are physically displaced from each other on the stator of the motor, and which carry currents which are displaced in phase.

In starting motors of this type, both windings are connected in parallel to a single phase supply line and because of the phase displacement between their currents, a starting torque is developed. When the motor is accelerated to a sufficiently high speed, the auxiliary winding is disconnected from the single phase supply line, resulting in a more efficient operation of the motor. To do this, a speed sensitive switching device is generally inserted in the auxiliary winding circuit.

The usual speed sensitive device used is a centrifugal switch which disconnects the auxiliary winding by means of contacts in a stationary portion of the switch, which switch is activated at a predetermined rotational speed by mechanical linkage mounted on the shaft of the motor.

An alternate means of controlling the auxiliary winding of a split phase or a capacitor-start single phase electric motor is to use a current relay responsive to the motor current. Quite often, a voltage operated relay, connected across all or part of the auxiliary winding, is used in a capacitor-start motor.

All such speed sensitive devices have their limitations. The centrifugal switch most commonly used requires continual maintenance and adjustment due to the mechanical intricacies of its mechanism. The contacts used in any relay are subject to fouling by dirt or dust and require continual adjustment. A static switching device with no moving parts overcomes most of these limitations. Such a device is quiet operating, has no moving parts to fail, and requires a minimum of mounting space.

The primary purpose of a speed sensitive switching device is to disconnect the auxiliary winding from the power circuit when the motor is accelerated to a predetermined speed and to reconnect the auxiliary winding when the motor decelerates to a predetermined lower speed. In many conventional devices the pickup and dropout speeds at which the auxiliary winding is to be disconnected and connected into the power circuit are established during the manufacture of the device with no opportunity to adjust the pickup and dropout speeds as may be desired by the users.

The principal object of my invention is to provide a speed sensing control apparatus which will be highly reliable through the use of static devices, requiring little or no maintenance.

Another object of my invention is to provide a speed sensitive switching apparatus which can disconnect and reconnect the auxiliary winding at speed points which are adjustable over at least a restricted range.

Another object of my invention is to provide a speed sensitive switching apparatus which is quiet, both during starting and running of the electrical motor.

Another object of my invention is to provide a speed sensing switching apparatus capable of satisfactory operation under adverse environmental conditions, such as vibration, dust and corrosive atmospheres.

Further objects and advantages of my invention will be readily apparent from the following detailed description, taken in conjunction with the accompanying drawing, in which:

Figure 1 is a schematic wiring diagram showing an illustrative embodiment of my invention; and Figs. 2 and 3 are graphical representations illustrating characteristics of certain devices used in the circuit shown in Fig. 1.

My invention is illustrated in the drawing applied to a single phase electric motor 2 having a main or running primary winding 4 and an auxiliary or starting primary winding 6, which are disposed on the stator of the motor, approximately ninety electrical degrees apart, and which are designed so that their currents are displaced in phase. The motor 2 has a rotor member 8 of any suitable type, which carries a squirrel-cage secondary winding 10. It will be understood that although a motor of the split phase type has been shown, in which the phase displacement of the primary winding currents is produced by the design of the windings, the invention is also applicable to other types of single phase motors, such as the capacitor-start motor, in which the phase displacement is produced by a capacitor connected in series with the auxiliary winding.

One end of the main winding 4 and one end of the auxiliary winding 6 are connected together and to one side of the single phase supply line 12, through a line switch 14. The other end of the auxiliary winding 6 is connected to the other end of the main winding 4 through a rectifier assembly 16, and a hyperconductive negative resistance adjustable breakdown device 18 which will be more fully described hereinafter. The other end of the main winding 4 is connected to the other side of the single phase supply line 12 through the line switch 14.

The rectifier assembly 16 is connected in the same manner as a conventional full wave rectifier bridge having four arms, each containing a conventional rectifier device 20, and connected as shown to four terminals. The terminals are designated as an input pair of terminals 22, and an output pair of terminals 24, diagonally disposed to each other. The previously mentioned other ends of the main winding 4 and auxiliary winding 6 are connected across the input terminals 22 of the rectifier assembly 16. The hyperconductive negative resistance adjustable breakdown device 18 is connected across the output terminals 24 and is utilized in my invention in a switching mode.

It is to be understood that the hyperconductive negative resistance adjustable breakdown device 18 is neither a transistor nor a rectifier but contains some of the characteristics of each. It is a device which has the characteristic of blocking current flow in one direction thereby simulating a switch in the open position. In other words, if a potential is applied to the device in that direction, referred to as the reverse direction, a negligible current will flow even at a substantial voltage. If, however, the reverse potential is increased further in magnitude, a characteristic breakdown point is reached which is critical and the device will suddenly become hyperconductive, sustaining a high current flow with a very little voltage thereby simulating a switch in the closed position. By applying a small control current to such a device, the hyperconductive breakdown point can be adjusted to occur at a lower magnitude of voltage than without the control potential. Any suitable type of device having these characteristics may be utilized.

One suitable type of such a device is described and claimed in a copending application, Serial No. 649,038, filed March 28, 1957, by John Philips, and assigned to the same assignee as the present application. The device therein described is a three-zone semiconductor structure, either PNP or NPN, with an associated mass of metal attached to one of the zones having P-type conductivity in the former, or to one of the zones having N-type conductivity in the latter structure, and a control contact ohmically affixed to the intermediate zone in either structure. Electrical leads are connected to the first conductivity zones in either type of structure, to the control contact and to the mass of metal. The device is used in a switching mode in which the switching is controlled by appropriately applying control current in increasing magnitude to the device. The characteristics of such a breakdown device are illustrated in Fig. 2.

From that figure, it can be seen that by applying a control current, $I_c$, of magnitude greater than zero, the reverse voltage necessary to cause breakdown of the device can be reduced from the breakdown value at zero control current. Its unique breakdown characteristic can be applied indefinitely without altering the characteristics of the device.

Such a hyperconductive negative resistance adjustable breakdown device is connected into the rectifier assembly 16 through its collector element 27 and emitter element 28 across the output terminals 24. The device 18 also has a control element 26 by which control current can be applied to the device in a manner to be described later. The breakdown device 16 is somewhat analogous to a transistor so that the elements 26, 27, and 28 can be thought of as the control element 26, collector element 27, and emitter element 28 of the transistor art.

Referring to Fig. 1, when the line switch 14 is closed, an alternating current voltage is applied to the rectifier assembly 16. When either input terminal 22 is positive and the other input terminal 22 is negative, there is no current flow in the auxiliary winding 6 because a rectifier 20 will, at all times, block the current flow from one terminal 22 to the other terminal 22. The only other path left is across the terminals 24. However, the device 18 through its emitter-collector circuit is connected across the load terminals 24. No matter which input terminal 22 is positive or negative no current will flow in the auxiliary winding 6 as long as the breakdown voltage of the device 18 is larger than the reverse voltage applied across it from the power line 12. Hence, the breakdown device 18 is non-conductive allowing no current to pass between the terminals 24.

Means for applying a control voltage have been provided, however, through the control element 26 and the emitter element 28. Through the elements 26 and 28 a biasing potential can be applied to the device 18, thereby initiating a control current capable of controlling the breakdown voltage point of the device.

To provide such a control potential, a transformer 32 is used to isolate and step down the voltage from the power supply source 12. A line switch 34 provides means for applying line voltage to the primary winding of the transformer 32. A rectifier 36 rectifies the secondary voltage of the transformer 32 and a capacitor 38 filters the secondary voltage. The capacitor 38 is connected to be charged with a polarity as shown in Fig. 1. Sufficient control current will then flow to the breakdown device 18 to cause its breakdown voltage point to be substantially reduced and even approach zero. The control current flow in the device 18 can be limited and determined by the resistor 40, which is shown connected in series with the capacitor 38 across the emitter-control element circuit of the device 18.

When the breakdown device 18 has an appropriate control current sufficient to reduce the breakdown point of the device 18 to a comparatively low level, current will flow between the load terminals 24, since the device 18 will be conductive. Thus, as the input terminals 22 alternately become positive and negative due to the alternating current voltage applied thereto from the power line 12, current will flow through the diagonally disposed legs of the rectifier assembly 16 and hyperconductive negative resistance adjustable breakdown device 18. It is clear then that the device 18 with appropriate control current applied to it becomes conductive thereby allowing current to flow in the auxiliary or starting winding 6. Should external means be applied to block the control current to the device 18, the breakdown point of the hyperconductive negative resistance adjustable breakdown device would once again increase to a level greater than the rectified voltage appearing across it from the power line 12. When this occurs, the breakdown device 18 will once again become non-conductive, as the rectified full wave direct current magnitude approaches zero and each half-cycle of the applied alternating current voltage. From Fig. 2, it can be seen that when the voltage magnitude becomes zero the breakdown device 18 becomes reset and must once again break down to allow conduction.

A blocking current is applied to the control circuit of the device 18 by a speed sensitive device of any suitable type that will give an output voltage responsive to speed. One such device 44 is shown diagrammatically as being of the inductor alternator type.

The speed sensitive device 44 has a rotating member 46 and a stationary member 48. The rotating member 46 is mounted to rotate with the rotor 8 of the single phase electric motor 2. The rotating member 46 is formed to have a number of projections 50 and is composed of any magnetically permeable substance such as soft iron. The stationary member 48 has a magnetized field structure comprising a permanent magnet 52 of any suitable material with a winding 54 mounted thereon to encircle the magnetic flux of the permanent magnet 52. The stationary member 48 is shaped to cooperate with the rotating magnetically permeable member 46.

The rotating member 46 with its projections 50 is positioned to vary the air gap between the rotating member 46 and the stationary member 48 as the member 46 rotates, thereby varying the total reluctance of the magnetic circuit of the permanent magnet 52 in the same manner as in an inductor alternator. The variations in reluctance in the magnetic circuit of the permanent magnet 52 result in a voltage output signal being induced in the winding 54 having a magnitude proportional to the speed of rotation of the rotating member 46.

The output signal induced in the winding 54 is rectified by a rectifier 56 and filtered by the capacitor 58. As the speed of the rotating member 46 increases the direct current voltage on the capacitor 58 increases in magnitude. The direct current voltage on the capacitor 58 is built up with a polarity as indicated in Fig. 1.

Current flow from the capacitor 58, however, is blocked by a hyperconductive negative resistance device 60. It is to be understood that a hyperconductive negative resistance device is a device which has the characteristic of blocking current flow in one direction. It exhibits the characteristic that when the reverse voltage applied thereto exceeds a specific value, the device will become highly conductive and thereafter carry substantial current at low voltages until either the current or the applied voltage is reduced to a very low value. Its unique breakdown characteristic can be repeated indefinitely without altering the characteristics of the device. Such a device 60 has a characteristic curve as shown in Fig. 3, and is quite similar to the hyperconductive negative resistance adjustable breakdown device 18 previously described. The device 60, however, contains no control element and therefore has a fixed breakdown point. One suitable type of such a device is described and claimed in a copending application Serial No. 642,743, filed February 27, 1957, by John Philips, and assigned to the same assignee as the present application. As more fully described in that application, the device 60 is a semiconductor having a three-zone and mass of metal structure similar to the hyperconductive negative resistance adjustable breakdown device 18 previously described, but has no ohmically affixed control contact. At lower speeds, the voltage impressed across the device 60 by the capacitor 58 is insufficient to cause breakdown of the device 60. However, as the speed of the rotating member 46 increases, the magnitude of voltage on the capacitor 58 and the device 60, reaches the breakdown point of the device 60 at a predetermined speed. When breakdown occurs, the device 60 becomes conductive.

Upon breakdown of the device 60, current will flow through a resistor 62 to the control element 26, emitter element 28 circuit and back to the negative side of the capacitor 58. This current flow is opposite or reverse to the current flow resulting from the capacitor 38. The reverse control current flow will oppose the current flow through the device 18 resulting from the control potential applied to the device 18 from the capacitor 38. The result is that the potential across the capacitor 58 blocks or bucks the potential across the capacitor 38 resulting in no control current flow in the device 18, raising the breakdown point of the device 18 to a level greater than the potential being applied across the output terminals 24 of the rectifier assembly 16 so that the device 18 becomes non-conductive. A variable resistor 64 is connected across the hyperconductive negative resistance device 60 thereby allowing control of the voltage across the breakdown device 60 to permit adjustment to cause breakdown of the device 60 at different speeds of the rotating member 46 of the inductor alternator 44. At the same time, the resistor 62 controls the current flow through the device 60 when it has broken down. The recovery point of the breakdown device 60 at which it will once again become non-conductive can be controlled by the resistor 62. The ability to vary the voltage across the device 60 causing its breakdown at different rotational speeds, and the ability to vary the current through the device 60 thereby controlling the point at which it will once again become non-conductive, are important since they permit adjustment of the rotational speed at which the auxiliary winding 6 has current flow and the rotational speed at which the auxiliary winding 6 is blocked from current flow. The result is that the single phase electric motor 20 can have its switching speed varied as well as the speed at which the auxiliary winding is once again inserted in the circuit.

Upon initial energization of the motor, in order to develop torque to accelerate the motor, alternating current must flow in the main winding 4 and auxiliary winding 6. However, prior to any current flow through the auxiliary winding 6, which is necessary to obtain a starting torque, the line switch 34 must also be closed. Upon closing the line switch 34, the transformer 32 is energized, charging the capacitor 38 in such a manner as to cause control current to flow in the hyperconductive negative resistance adjustable breakdown device 18. This control potential applied across the breakdown device 18 remains essentially constant and is sufficient to lower the critical breakdown level of the device 18 to a value well within the magnitude of the alternating current voltage from the power lines 12. Hence, the device 18 is made conductive and allows current flow through the auxiliary winding 6. As the rotational speed of the rotor 8 increases, the potential across the capacitor 58 also increases as described previously. Upon the rotor 8 reaching a predetermined rotational speed, the potential across the capacitor 58 becomes sufficient to cause a breakdown of the hyperconductive negative resistance device 60. At this time a reverse control current is caused to flow in the breakdown device 18 thereby blocking the control voltage on the device 18 and forcing the device 18 to once again become non-conductive. This then effectively blocks current flow in the auxiliary winding 6 and allows the motor to continue acceleration to its operating speed in the most efficient manner on the main winding 4 alone.

Should the motor decelerate due to any cause, the hyperconductive negative resistance device 60 will continue to be conductive, since it has the inherent characteristic of being hyperconductive once a breakdown voltage has been applied across it. Therefore, reverse current will continue to flow through the device 18 even though the rotational speed of the rotor 8 has decreased to a level well below the level originally necessary to cause breakdown of the device 60. Thus, it can be seen that the invention allows current flow to be blocked in the auxiliary winding 6 at one given rotational speed and, in turn, allows current flow in the auxiliary winding 6 at a lower rotational speed of the rotor 8. Both speed points can be adjusted over a restricted range of the speed curve of the single phase electric motor 2. When the motor speed approaches zero, the breakdown device 60 will be reset and require once again the application of breakdown voltage to become conductive.

It is apparent that my invention has provided a completely static speed sensitive switching apparatus for the control of a single phase electric motor. My invention is capable of trouble-free operation requiring very little or no maintenance. Its operating characteristics are not affected by moisture, dirt, or corrosive atmospheres in which many such single phase electric motors are applied.

While my invention has been shown and described with a particular preferred embodiment for the purpose of illustration, it is to be understood that the invention is not limited to the specific details shown, but in its broadest aspects it includes all equivalent embodiments, alterations and modifications which come within the spirit and scope of my invention.

I claim as my invention:

1. In combination, a single phase electric motor having an auxiliary winding circuit and a main winding circuit adapted to be connected to a single phase power supply, the auxiliary winding circuit including a hyperconductive negative resistance adjustable breakdown device for blocking current flow in the auxiliary winding circuit, the breakdown voltage of the device being greater than the magnitude of the potential across the device from the power supply, circuit means providing a control potential to said device for reducing the breakdown voltage level of the device to a value below the magnitude of the power supply potential, and speed sensitive voltage responsive means for providing a blocking voltage preventing the application of said control voltage to said device.

2. In combination, a single phase electric motor having an auxiliary winding circuit and a main winding circuit adapted to be connected to a single phase power supply, rectifier means for blocking current flow in either direction of the auxiliary winding circuit, a hyperconductive negative resistance adjustable breakdown device connected across the rectifier means to permit current flow in either direction in said auxiliary circuit when the breakdown device is conductive.

3. In combination, a single phase electric motor having a rotatable member and a stationary member, an auxiliary winding circuit and a main winding circuit disposed on said stationary member and adapted to be connected to a single phase power supply, the auxiliary winding circuit including a hyperconductive negative resistance adjustable breakdown device for blocking current flow in the auxiliary winding circuit, the breakdown voltage of the device being greater than the magnitude of the potential across the device from the power supply, circuit means for providing a control voltage to said device for reducing the breakdown voltage level of the device to a value below the magnitude of the power supply potential, speed sensing means having an output proportional to the speed of the motor for blocking the application of said control voltage to said device, and hyperconductive negative resistance means for preventing application of said output of the speed sensing means until the output of the speed sensing means reaches a magnitude corresponding to a predetermined speed of the motor.

4. In combination, a single phase electric motor having an auxiliary winding circuit and a main winding circuit adapted to be connected to a single phase power supply, the auxiliary winding circuit including an auxiliary winding in electrical series connection with a plurality of rectifiers connected in a bridge circuit having input terminals and output terminals, the potential from the power supply being impressed upon the input terminals, a hyperconductive negative resistance adjustable breakdown device connected across the output terminals, the breakdown voltage of the device being greater than the magnitude of the potential across the device from the power supply thereby blocking current flow in the auxiliary winding circuit, circuit means providing a control potential to said device for reducing the breakdown voltage level of the device to a value below the magnitude of the power supply potential, and speed sensitive means for providing a blocking voltage preventing the application of said control voltage to the device above a predetermined speed of the motor.

5. In combination, a single phase electric motor having an auxiliary winding circuit and a main winding circuit, adapted to be connected to a single phase power supply, the auxiliary winding circuit including an auxiliary winding in electrical series connection with a plurality of rectifiers connected in a bridge circuit having input terminals and output terminals, the potential from the first power supply being impressed upon the input terminals, a hyperconductive negative resistance adjustable breakdown device including a first element, a second element, and a control element, said device having its first element and second element connected across the output terminals, said device having an adjustable breakdown characteristic in response to a predetermined magnitude of control voltage, the breakdown voltage of the device being greater than the magnitude of the potential across the output terminals from the first power supply, thereby blocking current flow in the auxiliary winding circuit, circuit means for connecting a second power supply between the first element and control element with a control voltage sufficient to reduce the breakdown voltage level of the device to a value below the magnitude of the first power supply potential, and speed sensitive means for blocking said control voltage between the first element and control element above a predetermined speed of the motor.

6. In combination, a single phase electric motor having an auxiliary winding circuit and a main winding circuit adapted to be connected to a single phase power supply, the auxiliary winding circuit including an auxiliary winding in electrical series connection with a plurality of rectifiers connected in a bridge circuit having input terminals and output terminals, the potential from the single phase power supply being impressed upon the input terminals, a hyperconductive negative resistance adjustable breakdown device including a first element, a second element, and a control element, said device having its first element and second element connected across the output pair of terminals, said device having an adjustable breakdown characteristic in response to a predetermined magnitude of control current, the potential across the output terminals from the single phase power supply having a magnitude less than the breakdown voltage of the device, thereby blocking current flow in the auxiliary winding circuit, circuit means for connecting a second power supply between the first element and control element, the control current through the device from the second power supply being sufficient to reduce the breakdown voltage level of the device to a value below the magnitude of the single phase power supply potential, and means for providing a voltage signal varying in magnitude with the speed of the motor between the first element and control element, said signal blocking the control current flow through the device upon the speed of the motor exceeding a predetermined level.

7. In combination, a single phase electric motor having an auxiliary winding circuit and a main winding circuit adapted to be connected to a single phase power supply, the auxiliary winding circuit including an auxiliary winding in electrical series connection with a plurality of rectifiers connected in a bridge circuit having input terminals and output terminals, the potential from the single phase power supply being impressed upon the input terminals, a hyperconductive negative resistance adjustable breakdown device including a first element and a second element connected across the output terminals, said device having an adjustable breakdown characteristic in response to a predetermined magnitude of control current, the potential across the output terminals from the single phase power supply having a magnitude less than the breakdown voltage of the device, thereby blocking current flow in the auxiliary winding circuit, means for supplying a control current to said device, means for providing a signal varying in magnitude with the speed of the motor including a hyperconductive negative resistance device having a selected breakdown characteristic in response to a predetermined magnitude of voltage and capable of blocking said signal until the voltage across said hyperconductive negative resistance device from said signal exceeds the breakdown voltage of the hyperconductive negative resistance device, the current flow from said signal directed to oppose said control current above a predetermined speed thereby returning the breakdown voltage level of the hyperconductive negative resistance adjustable breakdown device to a level greater than the potential across the output terminals from said single phase power supply.

8. In combination, a single phase electric motor having a rotatable member and a stationary member, an auxiliary winding circuit and a main winding circuit disposed on said stationary member and adapted to be connected to a single phase power supply, the auxiliary winding circuit including a hyperconductive negative resistance adjustable breakdown device for blocking current flow in the auxiliary winding circuit, the breakdown voltage of the device being greater than the magnitude of the potential across the device from the power supply, circuit means providing a control potential to said device for reducing the breakdown voltage level of the device to a value below the magnitude of the power supply potential, and speed sensitive means for blocking said control potential above a predetermined speed, said speed sensitive means including an inductor alternator having a rotor adapted to rotate with said rotatable member and a stationary magnetized field structure having an alternating current voltage output with a magnitude proportional to the speed of rotation of said rotor, means for rectifying said alternating current voltage output from the stationary field winding structure, a hyperconductive negative resistance device blocking application of said output to said first mentioned device below a predetermined speed and allowing its application above a predetermined speed, said second mentioned device again blocking application of said output at a rotational speed well below the speed at which it originally allowed application of said output.

No references cited.